March 27, 1928.
O. A. ELLIS
1,663,689
GRIP WHEEL
Filed June 27, 1921
2 Sheets-Sheet 1
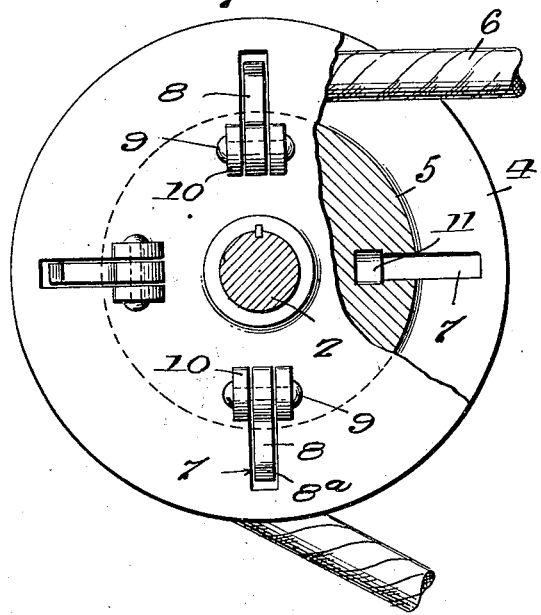
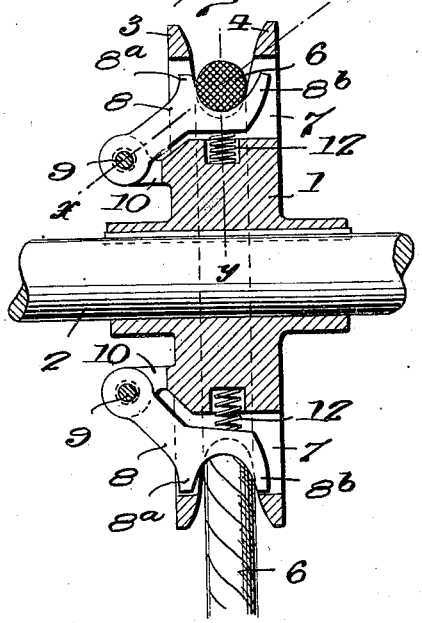
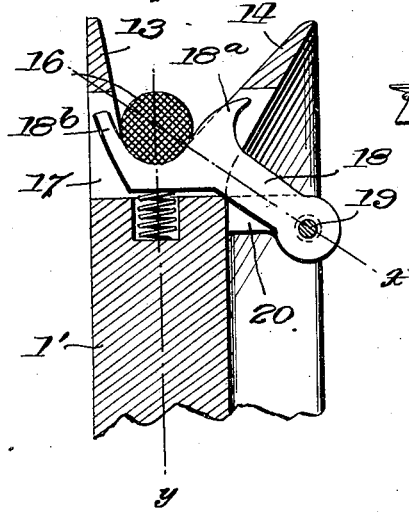
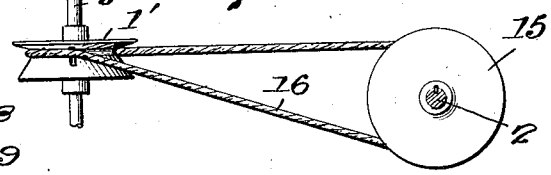
Inventor
Oscar A. Ellis,
By Prentiss, Stone & Boyden,
Attorneys.

March 27, 1928. 1,663,689
O. A. ELLIS
GRIP WHEEL
Filed June 27, 1921 2 Sheets-Sheet 2
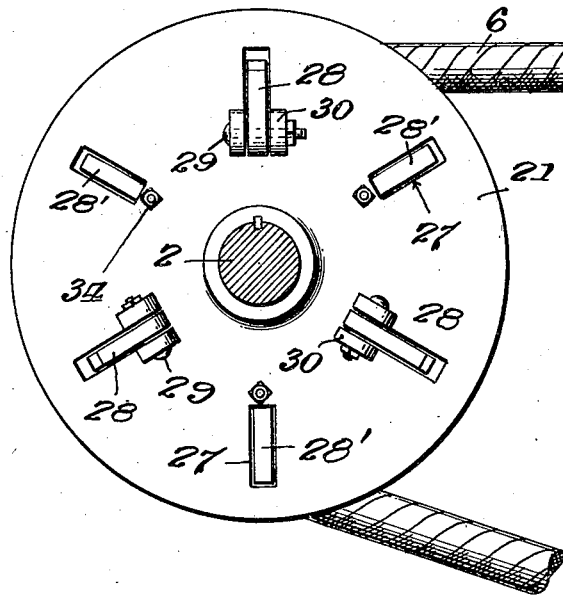
Fig. 5. Fig. 6.
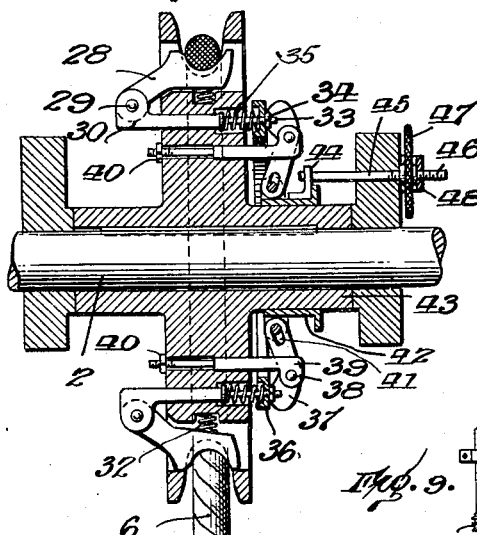
Fig. 7.
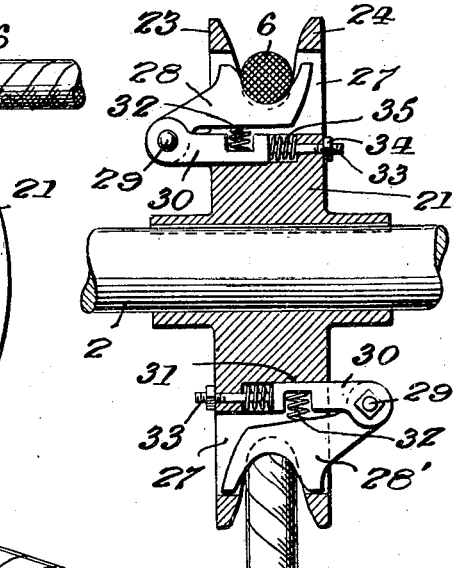
Fig. 8.
Fig. 9.
Inventor
Oscar A. Ellis,
By Prentiss, Stone & Boyden,
Attorneys.

Patented Mar. 27, 1928.

1,663,689

UNITED STATES PATENT OFFICE.

OSCAR A. ELLIS, OF SAN FRANCISCO, CALIFORNIA.

GRIP WHEEL.

Application filed June 27, 1921. Serial No. 480,820.

This invention relates to wheels or sheaves such as are used for the transmission of power by means of cable or rope drive.

The general object of the invention is to provide a wheel or sheave of this character which will positively and firmly grip the rope or cable and thus prevent slippage. Specific objects are to provide a grip wheel of the above character which will be simple and cheap in construction and practical and efficient in operation.

In order that the invention may be readily understood, reference is had to the accompanying drawings forming part of this specification and in which:—

Fig. 1 is a side elevation of one form of my improved grip wheel, parts being broken away and parts omitted for the sake of clearness.

Fig. 2 is a transverse section thereof.

Fig. 3 is a fragmentary transverse section similar to Fig. 2, showing a modified construction.

Fig. 4 is a diagrammatic view on a small scale, showing a rope transmission employing the type of wheel or pulley shown in Fig. 3.

Figs. 5 and 6 are a side elevation and transverse section respectively of a slightly different form of wheel or pulley.

Fig. 7 is a transverse section showing one method by which the gripping members may be simultaneously adjusted axially of the wheel.

Fig. 8 is a similar view showing a slightly different method of simultaneously adjusting the gripping members and also illustrating the type of flange embodied in Figure 3; and Fig. 9 is a fragmentary detail showing part of the gearing illustrated in Fig. 8.

Referring to the drawings in detail and more particularly to Figs. 1 and 2 thereof, 1 designates a wheel or pulley, the body of which may be of any desired construction, and which is shown as keyed to a shaft 2. The pulley is provided with a pair of peripheral flanges 3 and 4, forming between them a rope receiving groove 5, as usual. 6 designates the rope or cable which runs in this groove.

Extending transversely through these flanges 3 and 4 are a series of slots 7, and in these slots are located my improved, pivoted gripping members 8. Each of these members is in the nature of an arm having at one end a concave or forked seat comprising the branches $8^a$ and $8^b$, and pivoted at its other end on a pivot pin 9 carried by a fixed bracket 10 projecting laterally from one face of the pulley. The parts are preferably so proportioned that the angle between the axis of the gripping arm, as indicated by the line $x$, and the plane of the wheel, indicated by the line $y$, is greater than 45°, as such an arrangement gives a better gripping action. Furthermore, the lines $x$ and $y$ should intersect at the center of the rope or cable.

Formed in the bottom of the groove 5 adjacent each slot 7, is a pocket 11 adapted to receive a cushion spring 12 on which the gripping member 8 normally rests.

It will therefore be seen that when tension is applied to the rope or cable 6 the stress of such tension will force the gripping members inwardly against the pressure of the springs 12, thus causing them to swing upon their pivots 9 and pinching or gripping the rope between the fork $8^a$ and the flange 4 of the wheel, as clearly shown in Fig. 2. It is obvious that the greater the pull on the rope the tighter will it be gripped, and therefore slippage is entirely prevented under all loads and conditions.

It will be noted that as the gripping members pass out from under the rope or cable, they are thrown outwardly by centrifugal force, aided by the springs 12, so that, as they again pass under the rope, they are in full open or rope-receiving position.

In Figs. 3 and 4 I have illustrated a construction which I have found advantageous where power is to be transmitted between two pulleys 1' and 15, mounted on shafts 2' and 2 disposed at angles to each other. In this case the pulley 1' is provided with peripheral flanges 13 and 14, the flange 14 being disposed at a much greater angle to the plane of the wheel than the flange 13. As in Figs. 1 and 2, the wheel is provided with a series of transverse slots, designated 17, and in these slots work gripping members 18, pivoted at 19 to fixed brackets 20, carried by the wheel adjacent the inclined flange 14. These gripping members are provided with forks $18^a$ and $18^b$, fork $18^a$, adjacent the inclined flange, preferably having a cam surface as shown in Fig. 3 and serving to grip the rope 16 between itself and the opposite flange 13. I have found that grips of this nature very much improve the operation of angularly disposed pulleys such as shown in Fig. 4.

While as shown in Figs. 1 and 2 the gripping members are all pivoted on the same side of the wheel, I have found it advantageous in some cases to pivot them alternately on opposite sides of the wheel. The effect of this is to deform the rope loop from a true plane by displacing it slightly in alternately opposite directions, the resulting zig-zag form increasing the effective gripping action. Such an arrangement is shown in Figs. 5 and 6, and in these figures I have illustrated the wheel as equipped with six gripping members instead of four. It will, of course, be understood that any desired member of such gripping members can be employed in either modification.

Some of the gripping members as designated at 28, are pivotally mounted on one side of the wheel, while alternate gripping members, such as designated by 28', are pivotally mounted on the other side of the wheel. All of these members work in slots 27 extending transversely through the flanges 23 and 24 of the wheel 21.

Also, instead of being carried by fixed brackets as shown in the other figures, I have illustrated the gripping members 28 and 28' in this figure as pivoted at 29 to arms 30 slidably mounted in the wheel and adjustable axially thereof by means of nuts 34 working over threaded shanks 33 carried by such arms. The arms 30 slide in grooves or channels 31 and between the end of each arm and the end of its channel is interposed a helical spring 35. This spring tends to hold the gripping members in the position shown in Fig. 6, and tends to shift them to the left if the nuts 34 are loosened. Also these springs 35 hold the gripping members yieldably and permit them to move toward the right in Fig. 6, should such movement become necessary. This yielding mounting for the gripping members permits them to shift laterally in case a joint or other obstruction in the rope or cable is encountered, and the adjusting nuts 34 permit of shifting the gripping members to accommodate ropes of different sizes. A spring 32 is interposed between each gripping member and its supporting arm 30 in order to yieldingly hold the gripping member out in rope-receiving position.

In Fig. 7, I have shown a construction substantially similar to that of Fig. 6, and in addition have illustrated means for simultaneously shifting or adjusting the gripping members axially of the wheel. To this end the threaded shanks 33, instead of co-operating with the wheel body as in Fig. 6, extend through a floating ring 36, and the adjusting nuts 34 work against the outer face of such ring. The springs 35 are interposed between this ring and arms 30.

A series of cam levers 37 is provided, each of such levers being pivoted at 38 to a bracket 39 adjustably secured in the wheel body by means of a nut 40. The outer ends or cam surfaces of the cam levers 37 bear against the outer face of the ring 36, and the inner ends of the cam levers 37 have a pin and slot connection 41 with a sleeve or collar 42 slidably mounted on the hub 43 of the wheel. A relatively stationary shifting fork or member 44 engages the sleeve 42 and is adapted to be moved by means of a rod 45 passing through a fixed support, and having a threaded outer end 46, on which works a hand wheel 47 mounted between the fixed support and a bracket 48. It is obvious that by turning the hand wheel 47, the rod 45 may be reciprocated and the sleeve 42 and ring 36 correspondingly shifted in one direction or the other.

In Fig. 8 I have shown a slightly different operating mechanism. Here, a shifting fork 44 is attached to a rod 49 having a screw threaded end on which works a worm wheel 50 held by a suitable bracket. Meshing with this wheel 50 is a worm 51 carried at the end of a shaft 52, provided with an operating handle 53 which co-operates with a fixed circular rack 54 by means of which the handle 53 may be locked in any desired adjusted position. Also, in Figure 8, I have illustrated the wheel as equipped with flanges 13' and 14', disposed at different angles, as shown on a larger scale in Figure 3.

It will thus be seen that I have provided an automatic grip wheel or sheave which lends itself to a variety of uses, and it is thought that the many advantages of the invention will be readily appreciated without further discussion.

What I claim is:—

1. A grip wheel comprising a pair of peripheral flanges forming between them a groove adapted to receive a rope in intimate contact therewith and a series of grip members mounted to swing about radially fixed pivot pins carried by said wheel and located adjacent to but both laterally of and radially inward of said groove, each of said members having a portion located at the bottom of said groove and extending under the rope, and when swung on its pivot, serving to grip the rope between itself and one of said peripheral flanges.

2. A grip wheel having a pair of peripheral flanges forming between them a groove adapted to receive a rope therein so that it will rest upon the bottom thereof, a series of grip members mounted to swing about radially fixed pivot pins carried by said wheel at one side thereof, and located radially inward of the bottom of said groove, and a spring yieldably holding said grip members in a non-clutching position, each of said members having a concave seat extending into the groove, under the rope, and serving, when swung on its pivot, to grip the rope between one wall of said seat and one of the said pair of peripheral flanges.

3. A rope pulley having two peripheral flanges, both disposed at an acute angle to the plane of the pulley, and forming between them a groove, one of said flanges being disposed at a greater angle to the plane of the pulley than the other, and a series of gripping elements pivoted laterally of the pulley on the side thereof adjacent but at a point radially inside of the said flange forming the greater angle, and each having a cam surface adapted to grip the rope between itself and the other flange.

4. A grip wheel having a peripheral rope-receiving groove, a series of pivoted gripping members carried by the wheel and extending transversely of said groove, and means for adjusting the pivots of said members axially of the wheel.

5. A grip wheel having a peripheral rope-receiving groove, a series of pivoted gripping members carried by the wheel and extending transversely of said groove, and means for simultaneously adjusting the pivots of all of the gripping members on one side of the wheel.

6. A grip wheel having a peripheral rope receiving groove, a series of pivoted gripping members extending transversely of said groove, and a series of arms on which said gripping members are mounted, said arms being slidably carried by said wheel and adjustable relative thereto.

7. A grip wheel having a peripheral rope receiving groove, a series of pivoted gripping members extending transversely of said groove, and a series of arms on which said gripping members are mounted, said arms being slidably carried by said wheel and capable of yielding axially thereof.

8. A grip wheel comprising a pair of peripheral flanges, a series of slots extending transversely through said flanges and a series of pivoted gripping members lying therein and each extending entirely across the space between said flanges, each gripping member having a forked rope receiving seat, both ends of said forked seat lying within said slots at all times.

In testimony whereof I affix my signature.

OSCAR A. ELLIS.